(United States Patent Office)

3,454,632
Patented July 8, 1969

3,454,632
PREPARATION OF HALOACETYL HALIDES
Irving L. Mador, Cincinnati, Ohio, and John A. Scheben, Erlanger, Ky., assignors to National Distillers and Chemical Corporation, New York, N.Y., a corporation of Virginia
No Drawing. Filed Oct. 15, 1965, Ser. No. 496,665
Int. Cl. C07c 51/58
U.S. Cl. 260—544       16 Claims

ABSTRACT OF THE DISCLOSURE

A process is provided for preparing haloacetyl halides from polyhalomethanes by reaction with carbon monoxide in the presence of a platinum or palladium triad catalyst, and optionally, a promoter for the catalyst.

---

This invention relates to a process for preparing haloacetyl halides from polyhalomethanes by reaction with carbon monoxide in the presence of a platinum or palladium triad catalyst and more particularly to the preparation of chloroacetyl chlorides by reaction of polychloromethanes with carbon monoxide in the presence of palladous chloride.

It is known that organic compounds in a wide variety can be carbonylated by reaction with carbon monoxide, using transition metal carbonyls, such as nickel carbonyl, iron carbonyl, cobalt carbonyl and manganese carbonyl. The reactions are discussed by Bird, Chem. Reviews, 62, 283 (1962), who suggests that they proceed in three distinct stages, initial reaction of the substrate with formation of a carbon-metal-bond, carbonyl insertion between the carbon and metal atoms, and then cleavage of the acyl-metal bond. The process is not, however, susceptible of application to halogenated compounds where the halogen is attached to the carbon being carbonylated. When, for instance, the halogen is attached to aceteylene, or as in an allyl halide or aryl halide, the product is dehalogenated, Jones et al., J. Chem. Soc. 763 (1951), Chuisoli, Gazz, chim. ital., 89, 1332 (1959), U.S. Patent No. 3,146,256, dated Aug. 25, 1964.

Frank et al., Ind. Eng. Chem., 41, 2061 (1949), reacted carbon monoxide with polychlorinated methanes at 850 to 950 atmospheres using aluminum chloride as a catalyst, obtaining chloroacetyl chlorides in good yields. Large amounts of aluminum chloride, of the order of 0.1 mole/mole of polychlorinated methane, are needed.

Wiezevich et al. U.S. Patent No. 2,062,344 reacted carbon monoxide and methylene chloride in the vapor phase at 700° C. using a copper metal catalyst. At these high temperatures, side reactions become significant, and it is difficult to obtain good yields.

In accordance with the instant invention, it has been found that reaction of a polyhalomethane and carbon monoxide in the presence of a platinum or palladium triad catalyst results in formation of a haloacetyl halide. The reaction is shown in the following scheme, using palladous chloride as illustrative:

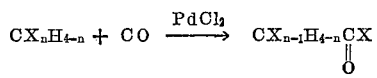

In the above scheme, X is halogen, such as fluorine, chlorine, bromine and iodine, and $n$ is an integer from 2 to 4. It will be seen that the carbon monoxide is inserted at a carbon-to-halogen bond of the polyhalomethane. The reaction proceeds at moderate temperatures in the liquid phase, and good yields are obtained of the haloacetyl halides.

The process of the invention is applicable to any polyhalomethane having two or more halogen atoms, of the same or different species, such as carbon tetrachloride, chloroform, methylene chloride, fluoroform, methylene bromide, methylene iodide, bromoform, iodoform, carbon tetrabromide, carbon tetraiodide, bromochloromethylene, dichlorodibromomethane, fluorotrichloromethane, difluorodibromomethane, fluorotriiodomethane, bromochloroiodomethane, and fluorochloromethylene.

The reaction can be carried out using any platinum or palladium triad metal catalyst. The platinum or palladium triad metals include ruthenium, rhodium, osmium, iridium, platinum and palladium.

As the platinum or palladium triad catalysts there can be used the free metal or a compound of the metal, such as a salt, for instance, the nitrates, chlorides, bromides, benzoates, sulfates or acetates; the oxides; or a complex of the metal with an organic compound, such as a benzonitrile complex, a bis-π-allyl complex or a chelate such as acetylacetonate. The catalyst, free metal or compound of the metal, can be supported on an inert carrier, such as carbon, alumina, or silica. The preferred catalysts are the palladium halides, such as palladous chloride and palladous bromide, which are readily available, relatively inexpensive and quite effective.

Other exemplary catalysts are palladium on carbon, palladous acetate, palladous benzoate, bis(benzonitrile) palladous chloride, and the chlorides of rhodium, ruthenium, platinum, iridium, and osmium, platinous acetate, rhodium oxide, palladous cyanide, rubidium carbonate, iridium chloride, potassium chloropalladite, and palladous acetylacetonate.

Salts of other transition metals act as promotors for the platinum or palladium triad catalyst. The preferred transition metal halides include cupric halides, nickel halides, ferric halides, and cobaltic halides. The halide is usually the same as that desired in the acyl halide product.

Compounds known to complex with the platinum or palladium triad group metals can also be added as cocatalysts. Examples of such ligands include triphenylphosphine, pyridine, benzonitrile and pentane-1,3-dione.

Small amounts of such promoters and cocatalysts suffice to give an improved effect. Amounts within the range from about 10 to about 1000 mole percent based on the catalyst are usually adequate, and a preferred range is from 50 to about 500 mole percent.

The reaction can be carried out by direct reaction of the polyhalomethane and carbon monoxide in the presence of the platinum or palladium triad catalyst.

An inert organic solvent can be present so as to facilitate the reaction. If the polyhalomethane is a liquid, no solvent is really necessary, but a solvent aids in providing contact between the catalyst and the polyhalomethane in the case of gaseous and solid materials. The reaction mixture is preferably anhydrous, so that anhydrous solvents should be employed.

Any inert solvent which is nonreactive with carbon monoxide under the reaction conditions can be employed, such as, for example, aliphatic and aromatic hydrocarbons, such as hexane, octane, decane, benzene, toluene, xylene, petroleum ether, naphthenes, nitrobenzene, mineral spirits, tetrahydrofuran, diethyl ether, dimethoxy ethane, and tributyl phosphine.

The reaction proceeds at moderate temperatures. The upper limit of temperature is normally established by the decomposition temperature of the reactants and reaction products. In general, the reaction will be carried out at a temperature from about 20° to about 250° C. Good yields are obtained at temperatures from about 100° to about 200° C. in a reasonable reaction time, and this range is therefore preferred. At temperatures below about 20°

C. the reaction rate may be unduly slow, but lower temperatures can be used, if time is not important.

The amount of carbon monoxide is in no way critical. Sufficient carbon monoxide is required to react mole for mole with the polyhalomethane, but an excess is normally employed. Usually, pressures within the range from about 30 to about 300 atmospheres will be employed. Excellent results are obtained at pressures within the range from about 50 to about 200 atmospheres, and accordingly this range is preferred.

The amount of catalyst that can be employed is surprisingly small. Only catalytic amounts are needed. Thus, from about 0.001 to about 5 molar percent based on the amount of polyhalomethane employed are quite satisfactory. A preferred proportion is within the range from about 0.01 to about 3 molar percent. Two or more catalysts can be employed together for advantageous effects.

At the conclusion of the reaction, the catalyst, cocatalyst and promoter can be separated by filtration or centrifuging, and the filtrate can then be subjected to fractional distillation, so as to separate any unreacted polyhalomethane and any added inert solvent. The reaction product which is the residue can be recovered by distillation, if desired, at reduced pressure, if it be high-boiling.

The reaction is easily adapted to a continuous operation by continuously blending the catalyst, polyhalomethane and any inert solvent, plus unreacted materials from a previous run, which blend is then cycled to a reactor, put under carbon monoxide pressure, and then held there for a dwell time adequate to effect the reaction. If desired, the reactor can be in the form of an elongated tube, the traverse time of which is equal to the reaction time. The reaction mixture is then worked up by separation of the solid materials by filtration or centrifuging, and distillation of polyhalomethane and inert solvent, if any. The residue is the desired haloacetyl halide.

The following examples in the opinion of the inventors represent preferred embodiments of their invention. All parts are by weight unless otherwise indicated.

EXAMPLE 1

In a glass liner of a Parr rocking autoclave was placed a suspension of 20 parts of palladous chloride in 860 parts of carbon tetrachloride. The reactor was closed, and carbon monoxide was added to a pressure of 36 atmospheres. The resulting mixture was heated and rocked for twelve hours at 200° C. until reaction appeared to be complete. After venting, the system was opened. The reaction mixture was filtered, to give a precipitate containing 56% palladium and a clear filtrate. Trichloroacetyl chloride was produced, and identified by vapor phase chromatography, and other analytical methods.

EXAMPLE 2

In an apparatus similar to that of Example 1, was placed a suspension of 11.2 parts of palladous chloride, 37 parts of cupric chloride and 880 parts of carbon tetrachloride. After flushing with carbon monoxide, pressures was adjusted to 100 atmospheres of carbon monoxide, and the reactor was then rocked at 170° C. for sixty-three hours. The reaction mixture was filtered giving a clear filtrate which analysis showed contained trichloroacetyl chloride.

EXAMPLE 3

A pressure reactor similar to that described in Example 1 was charged with 11.2 parts of palladous chloride, 37 parts of cupric chloride and 890 parts of carbon tetrachloride. After purging with carbon monoxide, pressure was adjusted to 160 atmospheres of carbon monoxide. The mixture was heated and rocked at 200° C. for sixty-seven hours. There was recovered, after separation of the catalyst, a product containing trichloroacetyl chloride. Ferric chloride employed in place of cupric chloride gives equivalent results.

EXAMPLE 4

The glass liner of a rocking autoclave, similar to that of Example 1, was charged with 4.3 parts of palladous chloride, and 100 parts of methylene chloride. This mixture was heated under a total pressure of 77 atmospheres of carbon monoxide at 85° C. for six hours. After venting and filtering off the catalyst, it was determined that monochloroacetyl chloride was produced.

EXAMPLE 5

To the apparatus described in Example 1 was charged 59 parts of 1% platinum on carbon, and 100 parts carbon tetrabromide. This mixture was heated under a total pressure of 150 atmospheres of carbon monoxide at 170° C. for twenty-four hours. Tribromoacetyl bromide was isolated and identified as a product.

The haloacetyl chlorides produced in accordance with the invention are highly reactive materials, and in most cases are known compounds. A specific and important use of these acyl halides is in the production of the corresponding halogenated acetic acids and esters, by simple hydrolysis and esterification procedures, all of which are conventional and well known to those skilled in this art, and require no further description. One of these acids, trichloroacetic acid, is useful medicinally for the removal of warts and as an astringent. Another, chloroacetic acid, is employed in the synthesis of indigo and related dyes, coumarin, barbiturates, vitamins, and 2,4-D herbicide. Iodoacetic acid is employed as a muscle poison in biological experimentation.

Having regard to the foregoing disclosure, the following is claimed as the inventive and patentable embodiments thereof:

1. A process for the preparation of haloacetyl halides from polyhalomethanes, which comprises reacting a polyhalomethane having the formula:

$$CX_nH_{4-n}$$

wherein the X is halogen, and $n$ is an integer from 2 to 4, with carbon monoxide in the presence of platinum, palladium, ruthenium, rhodium, osmium, or iridium catalyst, thereby forming the corresponding haloacetyl halide.

2. A process in accordance with claim 1 in which the reaction is carried out at a temperature within the range from about 20° to about 250° C.

3. A process in accordance with claim 1 in which the reaction is carried out in the presence of an inert organic solvent.

4. A process in accordance with claim 1 in which the carbon monoxide is added under the pressure within the range from about 30 to about 300 atmospheres.

5. A process in accordance with claim 1 in which the polyhalomethane is a dihalomethane.

6. A process in accordance with claim 1 in which the polyhalomethane is a trihalomethane.

7. A process in accordance with claim 1 in which the polyhalomethane is a tetrahalomethane.

8. A process in accordance with claim 1 in which the polyhalomethane is a chloromethane.

9. A process in accordance with claim 1 in which the polyhalomethane is a bromomethane.

10. A process in accordance with claim 1 in which the catalyst is a palladium catalyst.

11. A process in accordance with claim 10 in which the catalyst is a palladous halide.

12. A process in accordance with claim 1 which includes a transition metal salt as a promoter for the catalyst.

13. A process in accordance with claim 12 in which the promoter is selected from the group consisting of iron salts and copper salts.

14. A process in accordance with claim 12 in which the promoter is a metal halide.

15. A process in accordance with claim 14 in which the promoter is cupric chloride.

16. A process in accordance with claim 1 which includes a co-catalytic ligand for the catalyst.

References Cited

UNITED STATES PATENTS 3,309,403 4/1967 Mador et al. _____ 260—544
2,411,982 12/1946 Theobald _____ 260—544

OTHER REFERENCES

Olah: Friedel-Crafts and Related Reactions, vol. I, pp. 283 and 288.

LORRAINE A. WEINBERGER, *Primary Examiner.*

JAMES H. NIELSEN, *Assistant Examiner.*